(12) United States Patent
Uda et al.

(10) Patent No.: US 9,309,881 B2
(45) Date of Patent: Apr. 12, 2016

(54) ELECTRIC PUMP SYSTEM

(71) Applicant: JTEKT Corporation, Osaka-shi (JP)

(72) Inventors: Kengo Uda, Okazaki (JP); Yasuyuki Aoki, Okazaki (JP); Hiroki Kagawa, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 385 days.

(21) Appl. No.: 13/727,917

(22) Filed: Dec. 27, 2012

(65) Prior Publication Data

US 2013/0171008 A1 Jul. 4, 2013

(30) Foreign Application Priority Data

Dec. 28, 2011 (JP) ................................. 2011-288504

(51) Int. Cl.
*F04B 49/06* (2006.01)
*F16H 61/00* (2006.01)
*F16H 59/72* (2006.01)

(52) U.S. Cl.
CPC ............ *F04B 49/06* (2013.01); *F16H 61/0021* (2013.01); *F16H 61/0031* (2013.01); *F16H 59/72* (2013.01)

(58) Field of Classification Search
CPC ........ F04B 49/06; F04B 49/065; F04B 49/08; F04B 2203/0202; F04B 2205/05; F16H 61/0031
USPC ........... 417/44.1, 44.11, 45, 53, 411; 700/282
See application file for complete search history.

(56) References Cited

U.S. PATENT DOCUMENTS

| 2002/0091034 | A1 | 7/2002 | Nakamori et al. |
| 2002/0107103 | A1 | 8/2002 | Nakamori et al. |
| 2009/0241883 | A1* | 10/2009 | Nagoshi et al. ..... F02N 11/0825 123/179.4 |
| 2011/0095714 | A1* | 4/2011 | Kagawa ................... 318/400.21 |

FOREIGN PATENT DOCUMENTS

| DE | 102004046950 A1 * | 4/2006 |
| JP | 2002-206630 A | 7/2002 |
| JP | 2002-206634 | 7/2002 |
| JP | 2004-144020 A | 5/2004 |
| JP | 2009-185915 A | 8/2009 |
| JP | 2010-180731 A | 8/2010 |

OTHER PUBLICATIONS

U.S. Appl. No. 14/369,312, filed Jun. 27, 2014, Kagawa, et al.
U.S. Appl. No. 13/727,941, filed Dec. 27, 2012, Kagawa.
Partial English language translation of Notification of Reason(s) for Refusal issued Jun. 23, 2015 in Japanese Patent Application No. 2011-288504.

* cited by examiner

*Primary Examiner* — Nathan J Newhouse
*Assistant Examiner* — Philip Stimpert
(74) *Attorney, Agent, or Firm* — Oblon, McClelland, Maier & Neustadt, L.L.P.

(57) ABSTRACT

In an electric pump system, hydraulic fluid that is stored in an oil pan is supplied to a transmission mechanism through an oil passage by driving an oil pump with the use of a motor. An EOPECU estimates a hydraulic pressure of the hydraulic fluid on the basis of a driving current for the motor and a rotation speed of the motor, and executes drive control on the motor on the basis of the estimated hydraulic pressure value.

16 Claims, 9 Drawing Sheets

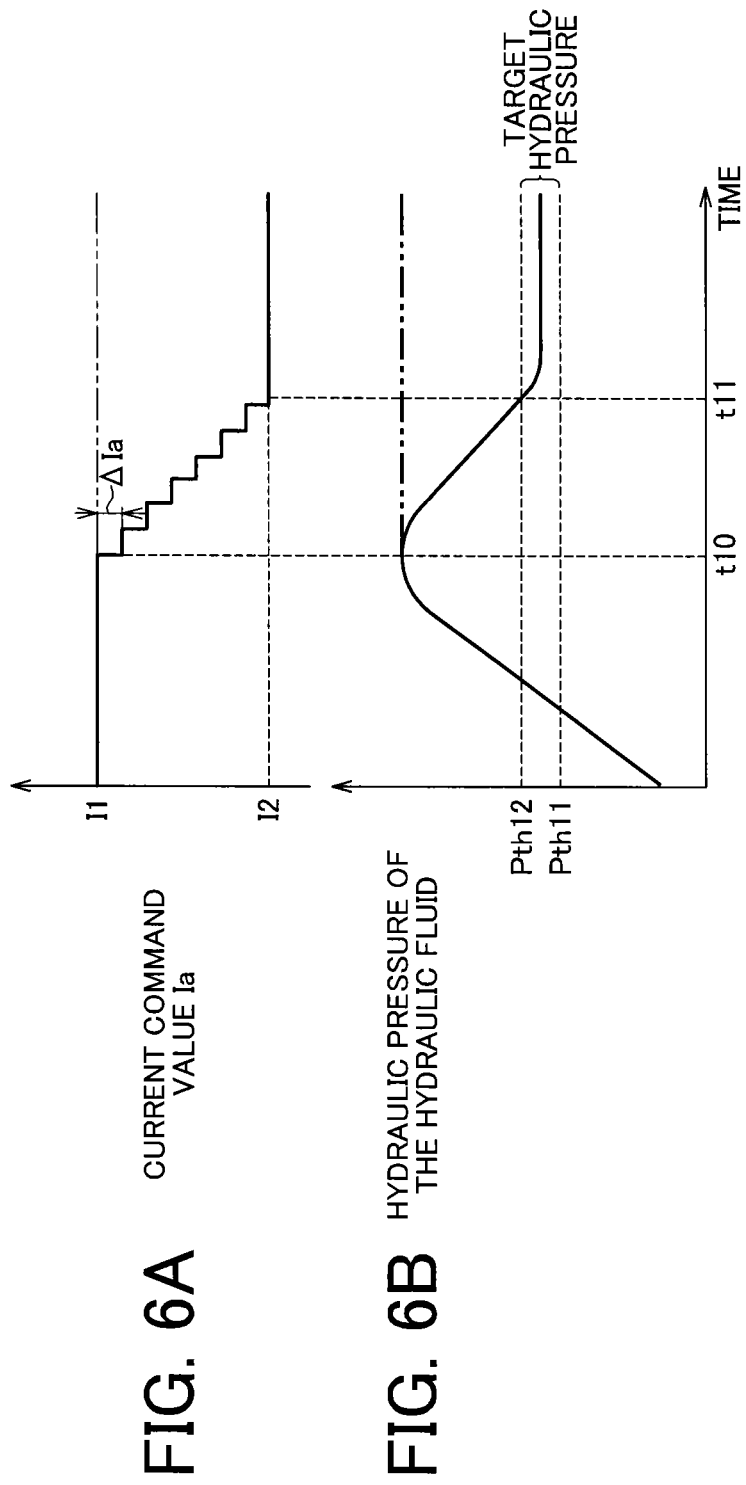

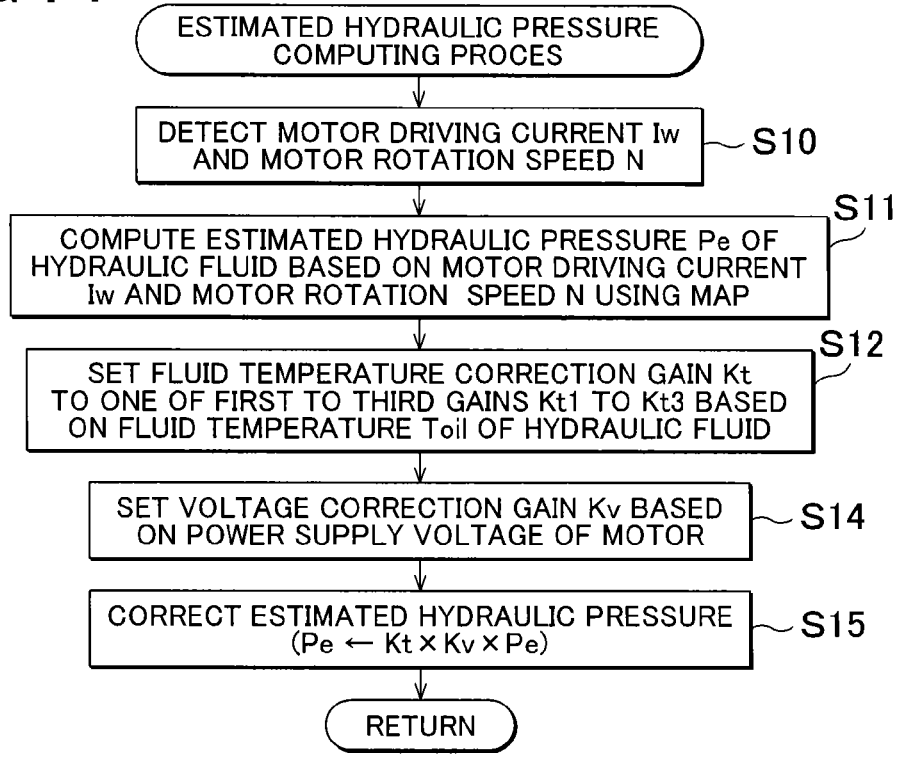
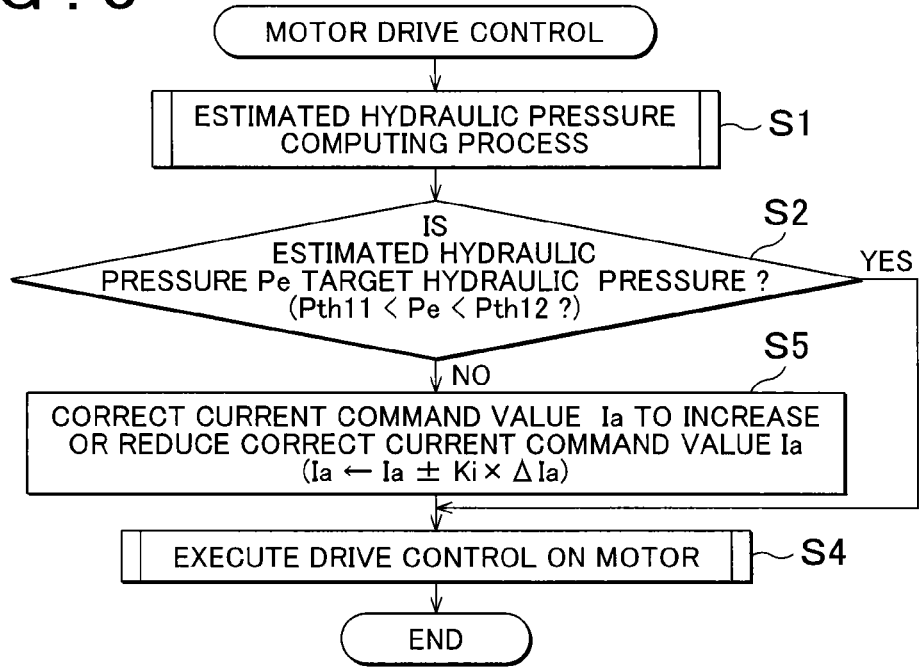

ELECTRIC PUMP SYSTEM

INCORPORATION BY REFERENCE

The disclosure of Japanese Patent Applications No. 2011-288504 filed on Dec. 28, 2011 including the specification, drawings and abstract, is incorporated herein by reference in its entirety.

BACKGROUND OF THE INVENTION

1. Field of the Invention

The invention relates generally to an electric pump system, and more specifically to an electric pump system that is suitable for use in a vehicle that has an idling stop function.

2. Description of Related Art

There is a vehicle that has a so-called idling stop function of automatically stopping an engine when the vehicle temporarily stops for parking or temporarily stops at a red light, and automatically starting the engine in response to a driver's vehicle starting operation. In the vehicle that has such an idling stop function, an idling time is reduced and therefore the fuel efficiency is improved.

A mechanical pump that is driven by the engine is usually mounted in the vehicle, and hydraulic fluid is supplied from the mechanical pump through an oil passage to hydraulically-actuated devices such as a transmission mechanism. Therefore, when the engine is automatically stopped by the above-described idling stop function, the mechanical pump is also stopped. In this case, when a driver attempts to start the vehicle after a restart of the engine, the hydraulic pressure that is required to actuate the hydraulically-actuated device may not be ensured and a shock may occur in the vehicle.

In a vehicle described in Japanese Patent Application Publication No. 2002-206634 (JP 2002-206634 A), a hydraulic pressure sensor that detects the hydraulic pressure in an oil passage and an electric pump system that uses a motor as a drive source are provided. While an engine is automatically stopped by an idling stop function, if the hydraulic pressure that is detected by the hydraulic pressure sensor becomes lower than or equal to a predetermined value, the hydraulic pressure that is required to actuate a hydraulically-actuated device is ensured by supplying hydraulic fluid from the electric pump system to the hydraulically-actuated device. In this way, it is possible to reliably ensure the hydraulic pressure that is required to actuate the hydraulically-actuated device at the restart of the engine. As a result, it is possible to suppress the above-described shock.

In order to further reliably suppress the shock, it is an effective way to control the hydraulic pressure of the hydraulic fluid, which is supplied from the electric pump system to the hydraulically-actuated device, to a value within a predetermined range of hydraulic pressures at which no shock occurs. Therefore, drive control on the electric pump system may be executed such that the hydraulic pressure that is detected by the hydraulic pressure sensor falls within the predetermined range.

On the other hand, the hydraulic pressure of the hydraulic fluid that is supplied from the mechanical pump to the hydraulically-actuated device is generally higher by several tens of times than the hydraulic pressure of the hydraulic fluid that is supplied from the electric pump system to the hydraulically-actuated device. Therefore, if the resolution of the hydraulic pressure sensor is set to a resolution corresponding to the hydraulic pressure of the mechanical pump, it is difficult to highly accurately detect the hydraulic pressure of the hydraulic fluid with the use of the hydraulic pressure sensor for the mechanical pump. Therefore, when drive control on the electric pump system is executed on the basis of the hydraulic pressure that is detected by the hydraulic pressure sensor for the mechanical pump, the hydraulic pressure of the hydraulic fluid may increase more than necessary and electricity may be wastefully consumed by the electric pump system.

SUMMARY OF THE INVENTION

It is an object of the invention to provide an electric pump system that consumes less electricity while further reliably ensuring the hydraulic pressure that is required to actuate a hydraulically-actuated device.

An aspect of the invention relates to an electric pump system, including: an oil pump that supplies hydraulic fluid to a hydraulically-actuated device through an oil passage as a motor is driven; and a control unit that executes drive control on the motor based on a hydraulic pressure of the hydraulic fluid in the oil passage. The control unit estimates a hydraulic pressure value of the hydraulic fluid based on a driving current for the motor and a rotation speed of the motor.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6A and FIG. 6B are timing charts that show an example of an operation of the electric pump system according to the first embodiment;

FIG. 7 is a flowchart that shows the procedure of an estimated hydraulic pressure computing process that is executed by an electric pump system according to a modified example to the first embodiment;

FIG. 8 is a flowchart that shows the procedure of drive control on a motor, which is executed by an electric pump system according to a second embodiment of the invention;

DETAILED DESCRIPTION OF EMBODIMENTS

Hereinafter, an electric pump system according to a first embodiment of the invention will be described with reference to FIG. 1 to FIG. 5 and FIGS. 6A and 6B. The electric pump system according to the first embodiment is used in a system that supplies hydraulic fluid to a transmission mechanism of a vehicle. A vehicle that has the above-described idling stop function is employed as the vehicle in the first embodiment. First, an oil supply system according to the first embodiment will be described with reference to FIG. 1.

Figure 1:
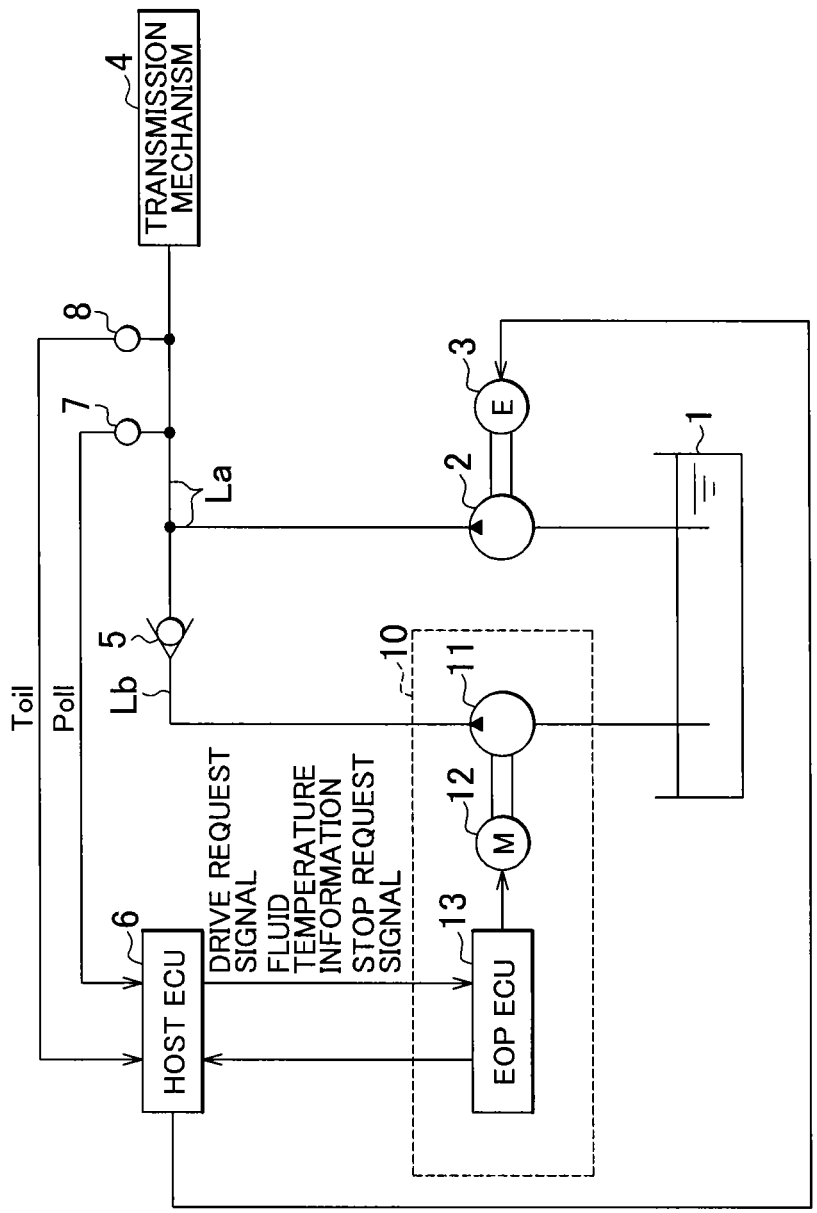
FIG. 1 is a block diagram that shows the system configuration of a vehicle oil supply system in which an electric pump system according to a first embodiment of the invention is used.

As shown in FIG. 1, in the oil supply system, hydraulic fluid stored in an oil pan 1 of the vehicle is drawn up through a mechanical pump 2. The mechanical pump 2 operates using an engine 3 as a drive source. The mechanical pump 2 pressurizes the hydraulic fluid drawn up from the oil pan 1, and delivers the pressurized hydraulic fluid to a transmission mechanism 4 through a main oil passage La. That is, in the oil supply system, when the engine 3 is driven, the hydraulic fluid is supplied to the transmission mechanism 4 on the basis of an operation of the mechanical pump 2.

An auxiliary oil passage Lb is connected to a midpoint of the main oil passage La, and an electric pump system 10 according to the present embodiment is provided on the auxiliary oil passage Lb. The electric pump system 10 is formed of an oil pump 11, a motor 12, and an electric oil pump (EOP) ECU 13. The oil pump 11 is provided at a midpoint of the auxiliary oil passage Lb. The motor 12 drives the oil pump 11. The EOPECU 13 executes drive control on the motor 12. In the electric pump system 10, the oil pump 11 is operated by driving the motor 12. Thus, the oil pump 11 draws up the hydraulic fluid from the oil pan 1 and pressurizes the hydraulic fluid, and then delivers the pressurized hydraulic fluid to the transmission mechanism 4 through the auxiliary oil passage Lb. A check valve 5 is provided at a midpoint of the auxiliary oil passage Lb. The check valve 5 prevents backflow of the hydraulic fluid from the main oil passage La. In the oil supply system, during a period in which the engine 3 is automatically stopped by the idling stop function, the electric pump system 10 operates instead of the mechanical pump 2, thus making it possible to supply the hydraulic fluid to the transmission mechanism 4.

The oil supply system includes a hydraulic pressure sensor 7 and a temperature sensor 8 that detects a temperature Toil of the hydraulic fluid. The hydraulic pressure sensor 7 detects a hydraulic pressure Poil of the hydraulic fluid in the main oil passage La. The temperature sensor 8 detects the temperature Toil of the hydraulic fluid in the main oil passage La. Outputs from the sensors are input into a host ECU 6 that comprehensively executes the idling stop function of the vehicle. When the host ECU 6 detects the fact that the vehicle is temporarily stopped on the basis of state quantities of the vehicle, such as a vehicle speed and an accelerator operation amount, which are detected by various sensors mounted in the vehicle, the host ECU 6 temporarily stops the engine 3. During a period in which the engine 3 is temporarily stopped, the host ECU 6 monitors the hydraulic pressure of the hydraulic fluid with the use of the hydraulic pressure sensor 7, and determines whether the hydraulic pressure of the hydraulic fluid is higher than or equal to a target hydraulic pressure. The target hydraulic pressure is set to a hydraulic pressure that is required to be supplied to the transmission mechanism 4 in order to suppress the above-described shock. When the hydraulic pressure of the hydraulic fluid is lower than the target hydraulic pressure, the host ECU 6 computes a value of current that should be supplied to the motor 12 of the electric pump system 10 on the basis of the difference between the hydraulic pressure of the hydraulic fluid and the target hydraulic pressure, and outputs a drive request signal that contains the computed current command value to the EOPECU (control unit) 13 via an in-vehicle network. During a period in which the engine is temporarily stopped, the host ECU 6 detects the temperature Toil of the hydraulic fluid with the use of the temperature sensor 8 at predetermined intervals, and outputs the information on the detected fluid temperature to the EOPECU 13 via the in-vehicle network. When the host ECU 6 detects the fact that a vehicle start operation is performed by a driver on the basis of the state quantities of the vehicle, which are detected by the various sensors, during a period in which the engine 3 is temporarily stopped, the host ECU 6 restarts the engine 3. When the host ECU 6 restarts the engine 3, the host ECU 6 outputs a stop request signal to the EOPECU 13 via the in-vehicle network.

The EOPECU 13 executes drive control on the motor 12 on the basis of the drive request signal, the fluid temperature information and the stop request signal from the host ECU 6.

Next, the electrical configuration and the operation of the EOPECU 13 will be described in detail with reference to FIG. 2.

Figure 2:
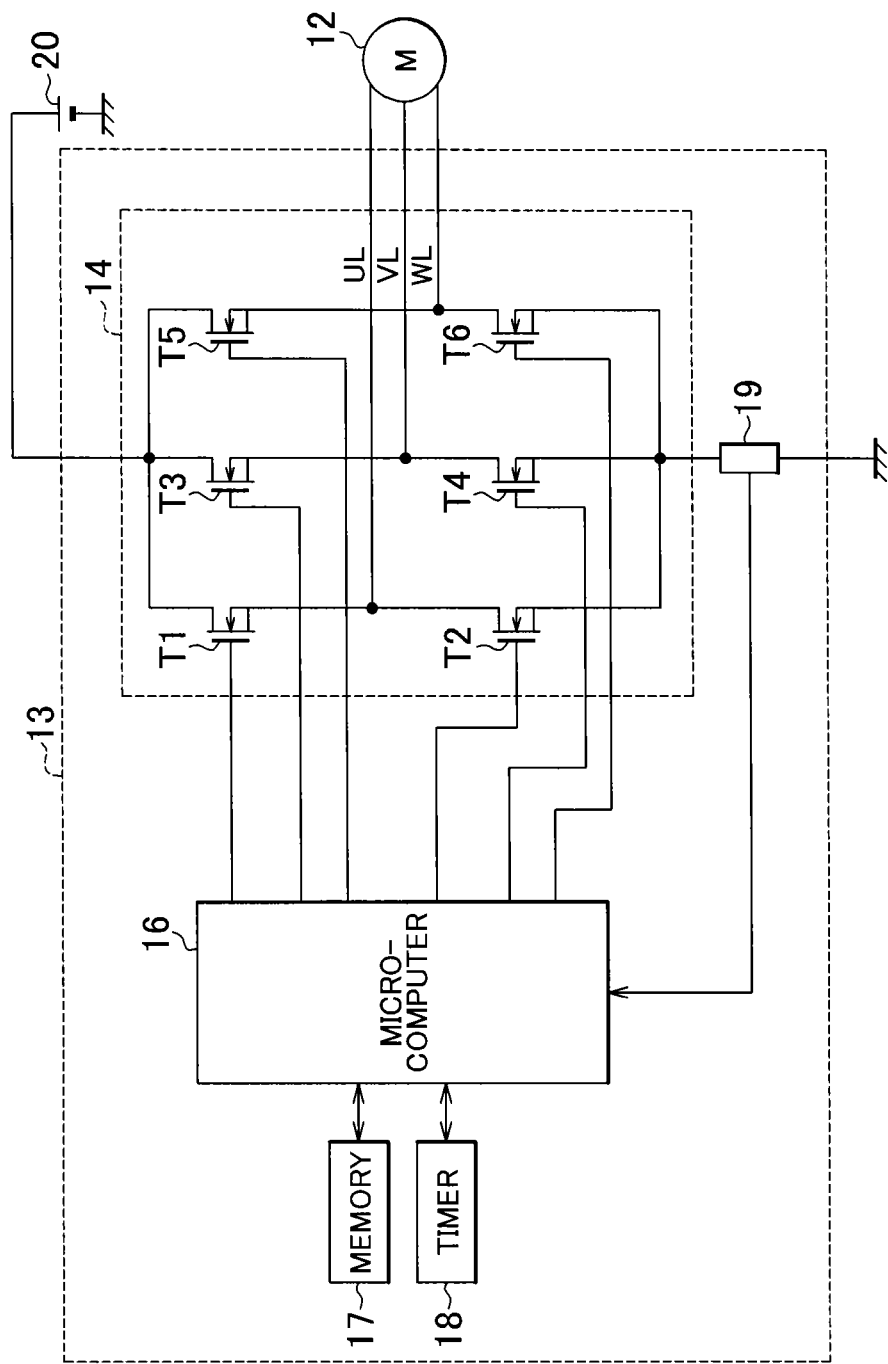
FIG. 2 is a block diagram that shows the configuration of an EOPECU in the vehicle oil supply system.

As shown in FIG. 2, the EOPECU 13 includes an inverter circuit 14 and a microcomputer 16. The inverter circuit 14 converts direct-current power into three-phase alternating-current power. The microcomputer 16 executes drive control on the motor 12 by driving the inverter circuit 14 through pulse width modulation (PWM). In addition, the EOPECU 13 includes a memory 17 and a timer 18.

The inverter circuit 14 is formed of a parallel circuit that includes a pair of transistors T1, T2, a pair of transistors T3, T4 and a pair of transistors T5, T6. Three-phase alternating-current power is generated from electric power output from connection points at which respective pairs of transistors are connected to each other.

The microcomputer 16 performs switching operations of the transistors T1 to T6 of the inverter circuit 14 by outputting gate drive signals to the transistors T1 to T6. Thus, direct-current power that is supplied from a power supply 20, such as an in-vehicle battery, is converted into three-phase alternating-current power, and the obtained three-phase alternating-current power is supplied to the motor 12 through a UL line, a VL line, and a WL line.

A current sensor 19 is provided at a midpoint of a ground line that extends from the transistors T2, T4, T6. The current sensor 19 detects the sum of values of U-phase, V-phase and W-phase currents that are supplied to the motor 12, that is, a driving current (actual current) that is supplied to the motor 12. An output from the current sensor 19 is input into the microcomputer 16.

When the microcomputer 16 receives the drive request signal from the host ECU 6, the microcomputer 16 executes feedback control on the driving current for the motor 12 on the basis of the current command value that is contained in the drive request signal. Specifically, the microcomputer 16 executes feedback control in which the gate drive signals for the inverter circuit 14 at each time are generated and output to the inverter circuit 14 in order to bring the driving current for the motor 12, which is detected by the current sensor 19, closer to the current command value that is contained in the drive request signal. Thus, the motor 12 is driven in accordance with the current command value from the host ECU 6, and the hydraulic pressure of the hydraulic fluid approaches the target hydraulic pressure.

The hydraulic pressure sensor 7 shown in FIG. 1 detects the hydraulic pressure of the hydraulic fluid that is supplied from the mechanical pump 2 to the transmission mechanism 4. Therefore, the resolution of the hydraulic pressure sensor 7 is set to a resolution that corresponds to the mechanical pump 2. On the other hand, the hydraulic pressure of the hydraulic fluid that is supplied from the mechanical pump 2 to the transmission mechanism 4 is higher by several tens of times than the hydraulic pressure of the hydraulic fluid that is supplied from the electric pump system 10 to the transmission mechanism 4. Thus, in the hydraulic pressure sensor 7, it is difficult to accurately detect the magnitude of the hydraulic pressure of the hydraulic fluid that is supplied from the electric pump system 10 to the transmission mechanism 4. Thus, as described above, when the current command value is set on the basis of the hydraulic pressure of the hydraulic fluid, which is detected by the hydraulic pressure sensor 7, and drive control on the electric pump system 10 is executed on the basis of the set current command value, it is difficult to cause the actual hydraulic pressure of the hydraulic fluid to converge to the target hydraulic pressure. In this case, for example, the hydraulic pressure of the hydraulic fluid that is supplied from the electric pump system 10 to the transmission mechanism 4 may increase more than necessary and electricity may be wastefully consumed by the electric pump system 10.

On the other hand, the magnitude of the hydraulic pressure of the hydraulic fluid that is supplied from the electric pump system 10 to the transmission mechanism 4 is determined on the basis of the power output from the motor 12. The power output from the motor 12 is correlated with the driving current for the motor 12 and the rotation speed of the motor 12. Furthermore, as the fluid temperature of the hydraulic fluid increases, the viscosity of hydraulic fluid decreases and the hydraulic pressure of the hydraulic fluid decreases. That is, there is also a correlation between the fluid temperature and the hydraulic pressure of the hydraulic fluid.

In the present embodiment, the hydraulic pressure of the hydraulic fluid that is supplied from the electric pump system 10 to the transmission mechanism 4 is estimated on the basis of the driving current for the motor 12 and the rotation speed of the motor 12, and the current command value is set on the basis of the estimated hydraulic pressure. In addition, the set current command value is corrected on the basis of the fluid temperature of the hydraulic fluid. The EOPECU 13 executes drive control on the motor 12 on the basis of the corrected current command value.

Figure 3:
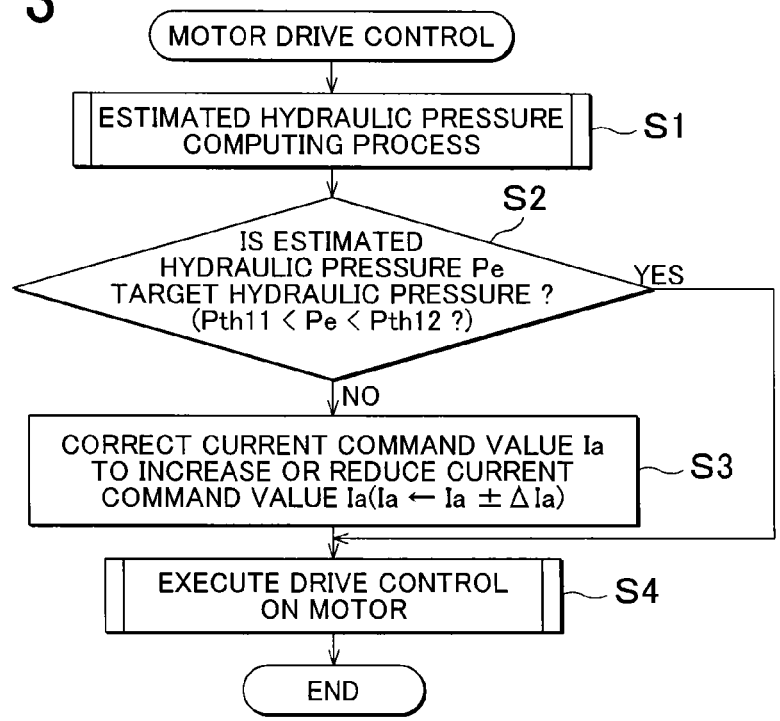
FIG. 3 is a flowchart that shows the procedure of drive control on a motor, which is executed by the electric pump system according to the first embodiment.

Next, the procedure in which the EOPECU 13 executes drive control on the motor 12 will be described with reference to FIG. 3. Control shown in FIG. 3 is started when the drive request signal is transmitted to the EOPECU 13 from the host ECU 6. After that, the control is repeatedly executed at predetermined computation intervals during a period until the stop request signal is transmitted to the EOPECU 13 from the host ECU 6.

Figure 4:
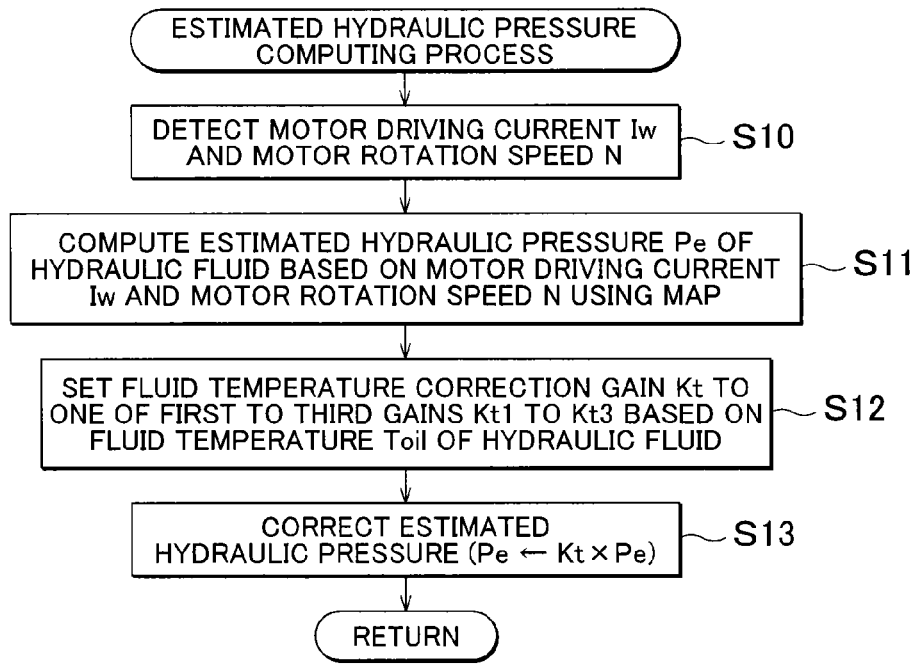
FIG. 4 is a flowchart that shows the procedure of an estimated hydraulic pressure computing process that is executed by the electric pump system according to the first embodiment.
Figure 5:
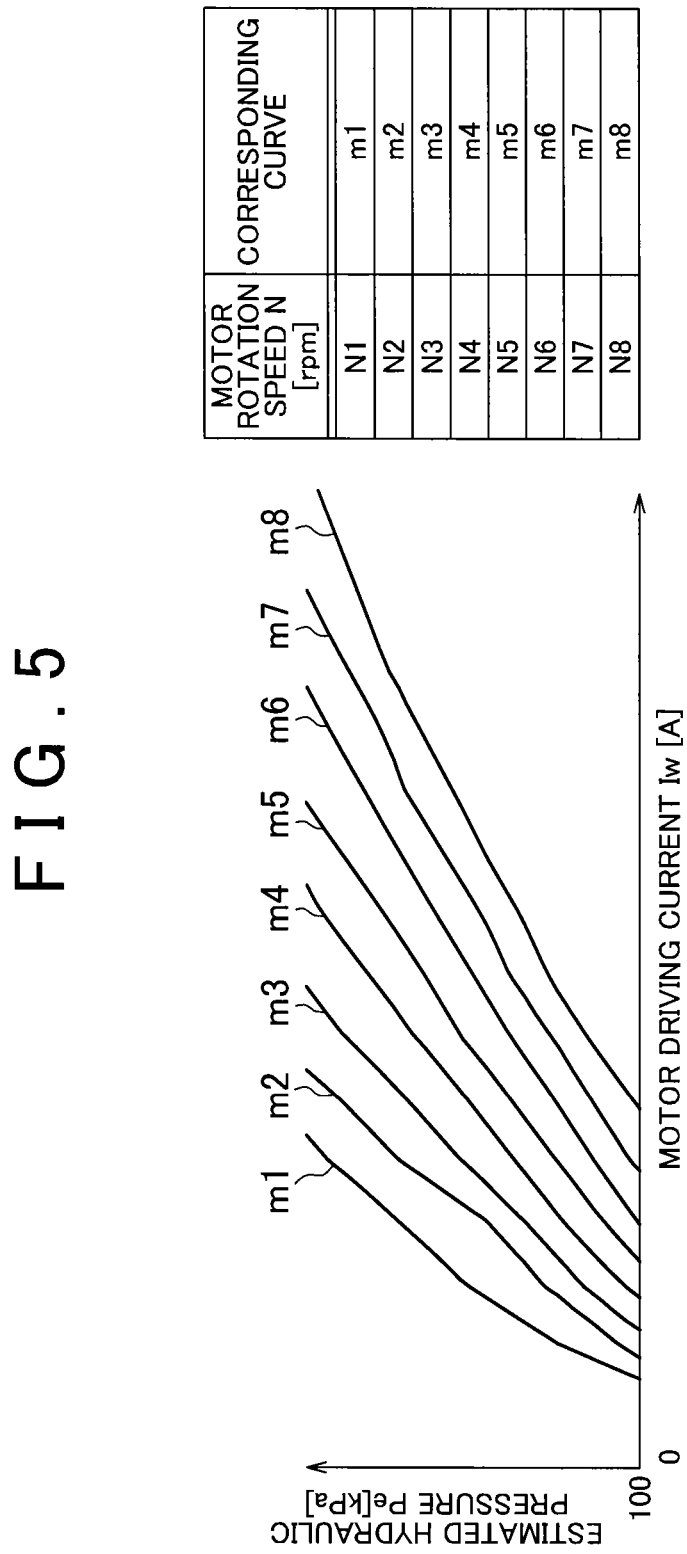
FIG. 5 is a map that shows the correlation among a motor driving current, a motor rotation speed and an estimated hydraulic pressure.

As shown in FIG. 3, in this control, first, the process of estimating the hydraulic pressure of the hydraulic fluid that is supplied from the electric pump system 10 to the transmission mechanism 4 is executed (step S1). As shown in FIG. 4, in the estimated hydraulic pressure computing process, first, a driving current Iw for the motor 12 and a rotation speed (number of revolutions) N of the motor 12 are detected (step S10). Specifically, the driving current Iw for the motor 12 is detected by the current sensor 19. The rotation speed N of the motor 12 is determined on the basis of the duty ratio of each of the gate drive signals (the ratio of a period of time during which each gate drive signal is on with respect to a unit period of time) that are input into the inverter circuit 14. Therefore, the rotation speed N of the motor 12 is obtained on the basis of the duty ratio of each gate drive signal. In the subsequent process in step S11, a hydraulic pressure Pe of the hydraulic fluid is estimated on the basis of the driving current Iw for the motor 12 and the rotation speed N of the motor 12. In the present embodiment, the correlation among the driving current Iw for the motor 12, the rotation speed N of the motor 12 and the estimated hydraulic pressure Pe is empirically obtained in advance, and the correlation among them is mapped as illustrated in FIG. 5 and is stored in the memory 17 of the EOPECU 13. In the map shown in FIG. 5, for the cases where the rotation speed N of the motor 12 is N1 to N8, the correlations between the driving current Iw for the motor 12 and the estimated hydraulic pressure Pe are indicated by the respective solid lines m1 to m8 (where N1<N2< . . . <N7<N8). As shown in FIG. 5, the estimated hydraulic pressure Pe becomes higher as the rotation speed N of the motor 12 becomes lower in the case where the driving current Iw for the motor 12 is the same, and the estimated hydraulic pressure Pe becomes higher as the driving current Iw for the motor 12 becomes higher in the case where the rotation speed N of the motor 12 is the same. In the process in step S11, the estimated hydraulic pressure Pe is computed on the basis of the driving current Iw for the motor 12 and the rotation speed N of the motor 12 using the map shown in FIG. 5. Values that are not on the solid lines m1 to m8 in the map shown in FIG. 5 are computed, as needed, through estimation using values on the solid lines. After the estimated hydraulic pressure Pe is computed, in the subsequent process in step S12, the fluid temperature Toil of the hydraulic fluid is detected on the basis of the information on the fluid temperature provided from the host ECU 6, and a fluid temperature correction gain Kt is set on the basis of the detected fluid temperature Toil of the hydraulic fluid. Specifically, as shown in the following a1) to a3), the fluid temperature correction gain Kt is set to one of first to third gains Kt1 to Kt3. Among the first to third gains Kt1 to Kt3, there is a correlation that Kt1>Kt2>Kt3.

a1) The fluid temperature Toil of the hydraulic fluid falls within a low fluid temperature range, that is, 0° C.≤Toil<40° C. In this case, the fluid temperature correction gain Kt is set to the first gain Kt1.

a2) The fluid temperature Toil of the hydraulic fluid falls within an intermediate fluid temperature range, that is, 40° C.≤Toil<80° C. In this case, the fluid temperature correction gain Kt is set to the second gain Kt2.

a3) The fluid temperature Toil of the hydraulic fluid falls within a high fluid temperature range, that is, 80° C.≤Toil<120° C. In this case, the fluid temperature correction gain Kt is set to the third gain Kt3. In the subsequent process in step S13, the estimated hydraulic pressure Pe is corrected by multiplying the estimated hydraulic pressure Pe, which is computed in step S11, by the fluid temperature correction gain Kt.

After the estimated hydraulic pressure Pe is computed in this way, as shown in FIG. 3, it is determined whether the estimated hydraulic pressure Pe is the target hydraulic pressure (step S2). In the present embodiment, the target hydraulic pressure is set to a value that falls within a range of which the lower limit is a first threshold Pth11 and of which the upper limit is a second threshold Pth12. In step S2, it is determined whether the estimated hydraulic pressure Pe satisfies the relationship, Pth11<Pe<Pth12. When the estimated hydraulic pressure Pe is not the target hydraulic pressure (NO in step S2), the current command value Ia is corrected to be increased or reduced as described in the following b1) and b2) (step S3).

b1) The estimated hydraulic pressure Pe is lower than or equal to the first threshold Pth11. That is, the hydraulic pressure of the hydraulic fluid is lower than the target hydraulic pressure, and the power output from the motor 12 is insufficient. In this case, the current command value Ia is corrected to be increased by a correction value ΔIa. As a result, the power that is output from the motor 12 increases.

b2) The estimated hydraulic pressure Pe is higher than or equal to the second threshold Pth12. That is, the hydraulic pressure of the hydraulic fluid is higher than the target hydraulic pressure, and the power output from the motor 12 is excessive. In this case, the current command value Ia is corrected to be reduced by a correction value ΔIa. As a result, the power that is output from the motor 12 decreases.

Immediately after the drive request signal is transmitted from the host ECU 6, the current command value contained in the drive request signal is used as the current command value Ia. After that, the immediately preceding current command value Ia is used.

In the subsequent process in step S4, drive control on the motor 12 is executed on the basis of the corrected current command value Ia. On the other hand, when the estimated hydraulic pressure Pe is the target hydraulic pressure (YES in step S2), drive control on the motor 12 is executed on the basis of the immediately preceding current command value Ia (step S4).

Next, an example of an operation (operation) of the electric pump system 10 according to the present embodiment will be described with reference to FIG. 6A and FIG. 6B. For example, when a current command value I1 is contained in the drive request signal output from the host ECU 6 to the EOPECU 13, if EOPECU 13 drives the motor 12 on the basis of the current command value I1, there is a possibility that the hydraulic pressure of the hydraulic fluid will become higher than the target hydraulic pressure and this high pressure state will continue as indicated by a long dashed double short dashed line in FIG. 6B. As a result, the power output from the motor 12 will be excessive.

In this regard, in the electric pump system 10 according to the present embodiment, the hydraulic pressure of the hydraulic fluid is estimated on the basis of the driving current for the motor 12, the rotation speed of the motor 12 and the fluid temperature of the hydraulic fluid. Therefore, it is possible to highly accurately detect the hydraulic pressure of the hydraulic fluid. As a result, as shown in FIG. 6B, it is possible to detect, for example, that the hydraulic pressure of the hydraulic fluid is higher than or equal to the second threshold Pth12 at time t10 even without using the hydraulic pressure sensor 7. At this time, in the electric pump system 10, as indicated by the solid line in FIG. 6A, after time t10, the current command value Ia is corrected to be reduced gradually by an amount corresponding to the correction value ΔIa. Therefore, the power output from the motor 12 gradually decreases. Thus, as shown in FIG. 6B, the hydraulic pressure of the hydraulic fluid is gradually reduced. After the hydraulic pressure of the hydraulic fluid becomes lower than the second threshold Pth12 at time t11, the current command value Ia is no longer corrected as shown in FIG. 6A. Therefore, the hydraulic pressure of the hydraulic fluid converges to the target hydraulic pressure. Thus, while a hydraulic pressure that is required to actuate the transmission mechanism 4 is reliably ensured, it is possible to reduce the current command value Ia for the motor 12 from the value I1 to the value I2 as shown in FIG. 6A. Thus, it is possible to suppress an excessive power output from the motor 12. As a result, it is possible to reduce the electricity that is consumed by the electric pump system 10.

When the hydraulic pressure of the hydraulic fluid is lower than or equal to the first threshold Pth11, the current command value Ia is corrected to be increased gradually by an amount corresponding to the correction value ΔIa. Therefore, the power that is output from the motor 12 gradually increases. Thus, the hydraulic pressure of the hydraulic fluid gradually increases. As a result, it is possible to cause the hydraulic pressure of the hydraulic fluid to converge to the target hydraulic pressure. Therefore, in this case as well, it is possible to reliably ensure the hydraulic pressure that is required to actuate the transmission mechanism 4.

As described above, with the electric pump system according to the present embodiment, the following advantageous effects are obtained.

1) The hydraulic pressure of the hydraulic fluid is estimated on the basis of the driving current for the motor 12 and the rotation speed of the motor 12. Drive control on the motor 12 is executed on the basis of the estimated hydraulic pressure Pe. Thus, it is possible to reduce the electricity that is consumed by the electric pump system 10, while the hydraulic pressure that is required to actuate the transmission mechanism 4 is reliably ensured.

2) The fluid temperature correction gain Kt is set on the basis of the fluid temperature of the hydraulic fluid. The estimated hydraulic pressure Pe is corrected on the basis of the set fluid temperature correction gain Kt. Therefore, it is possible to further highly accurately estimate the hydraulic pressure of the hydraulic fluid.

3) The fluid temperature correction gain Kt is set to one of the first to third gains Kt1 to Kt3 for the respective three fluid temperature ranges defined in advance. Therefore, the EOPECU 13 is required just to execute computation process of correcting the estimated hydraulic pressure Pe for each of the three fluid temperature ranges. Therefore, it is possible to reduce the computation load on the EOPECU 13.

4) In the EOPECU 13, when it is determined that the estimated hydraulic pressure Pe is not the target hydraulic pressure, the current command value Ia for the motor 12 is corrected to be increased or reduced by the correction value ΔIa such that the estimated hydraulic pressure Pe approaches the target hydraulic pressure. Thus, it is possible to easily and reliably bring the hydraulic pressure of the hydraulic fluid closer to the target hydraulic pressure.

FIG. 7 shows an electric pump system according to a modified example to the first embodiment. An in-vehicle battery is usually used as a power source for the motor 12. Therefore, when the voltage value of the in-vehicle battery decreases due to aged degradation, or the like, of the in-vehicle battery, the power output from the motor 12 also decreases. Accordingly, the hydraulic pressure of the hydraulic fluid decreases. That is, there is also a correlation between the hydraulic pressure of the hydraulic fluid and the power supply voltage of the motor 12. As shown in FIG. 7 that shows a flowchart corresponding to the estimated hydraulic pressure computing process illustrated in FIG. 4, after the fluid temperature correction gain Kt is set on the basis of the fluid temperature Toil of the hydraulic fluid (step S12), a voltage correction gain Kv may also be set on the basis of the power supply voltage of the motor 12 (step S14). For example, when a reference voltage that is set in advance for the power supply voltage of the motor 12 is V0 and the present power supply voltage of the motor 12 is V1, the voltage correction gain Kv may be obtained according to an equation, $Kv=V1/V0$. In the subsequent process in step S15, the estimated hydraulic pressure Pe is corrected by multiplying the estimated hydraulic pressure Pe by the fluid temperature correction gain Kt and the voltage correction gain Kv. With the above configuration, it is possible to highly accurately estimate the hydraulic pressure of the hydraulic fluid.

Next, an electric pump system according to a second embodiment of the invention will be described. The electric pump system according to the second embodiment is used in a system that supplies hydraulic fluid to a transmission mechanism of a vehicle. The basic configuration of an oil supply system to which the electric pump system according to the second embodiment is applied is similar to that of the oil supply system illustrated in FIG. 1.

In the present embodiment, a multiplication coefficient (correction gain) Ki is set for the correction value AIa that is used to correct the current command value Ia for the motor 12. When a drive request signal is transmitted from the host ECU 6 to the EOPECU 13, the correction gain Ki is set to a first gain Ki1 as its initial value. When the estimated hydraulic pressure Pe is around the target hydraulic pressure and in a stable state, the correction gain Ki is set to a second gain Ki2 that is smaller than the first gain Ki1. That is, in the present embodiment, two correction values, that is, a first correction value obtained by multiplying the correction value ΔIa by the first gain Ki1 and a second correction value obtained by multiplying the correction value Ala by the second gain Ki2 are used as the current command value Ia. By changing the correction gain Ki from the first gain Ki1 to the second gain Ki2, an amount of change in the current command value Ia is reduced. Thus, the response of the power output from the motor 12 is decreased. Hereinafter, the details of the control will be described with reference to FIG. 8 and FIG. 9. First, the procedure of drive control on the motor 12, which is executed by the EOPECU 13, according to the present embodiment will be described with reference to FIG. 8. In this control, the same processes as those illustrated in FIG. 3 are denoted by the same reference symbols in FIG. 3, and the description thereof is omitted. Mainly, the difference between the control in the present embodiment and the control in the first embodiment will be described below.

In the present embodiment, as shown in FIG. 8, when the estimated hydraulic pressure Pe is not the target hydraulic pressure (NO in step S2), the current command value Ia is corrected to be increased or reduced as described in the following c1) and c2) (step S5).

c1) The estimated hydraulic pressure Pe is lower than or equal to the first threshold Pth11. In this case, the estimated hydraulic pressure Pe is corrected to be increased by a value obtained by multiplying the correction value Ala by the correction gain Ki.

c2) The estimated hydraulic pressure Pe is higher than or equal to the second threshold Pth12. In this case, the estimated hydraulic pressure Pe is corrected to be reduced by a value obtained by multiplying the correction value ΔIa by the correction gain Ki. The correction gain Ki is set to the first gain Ki1 as its initial value when the drive request signal is transmitted from the host ECU 6 to the EOPECU 13.

Figure 9:
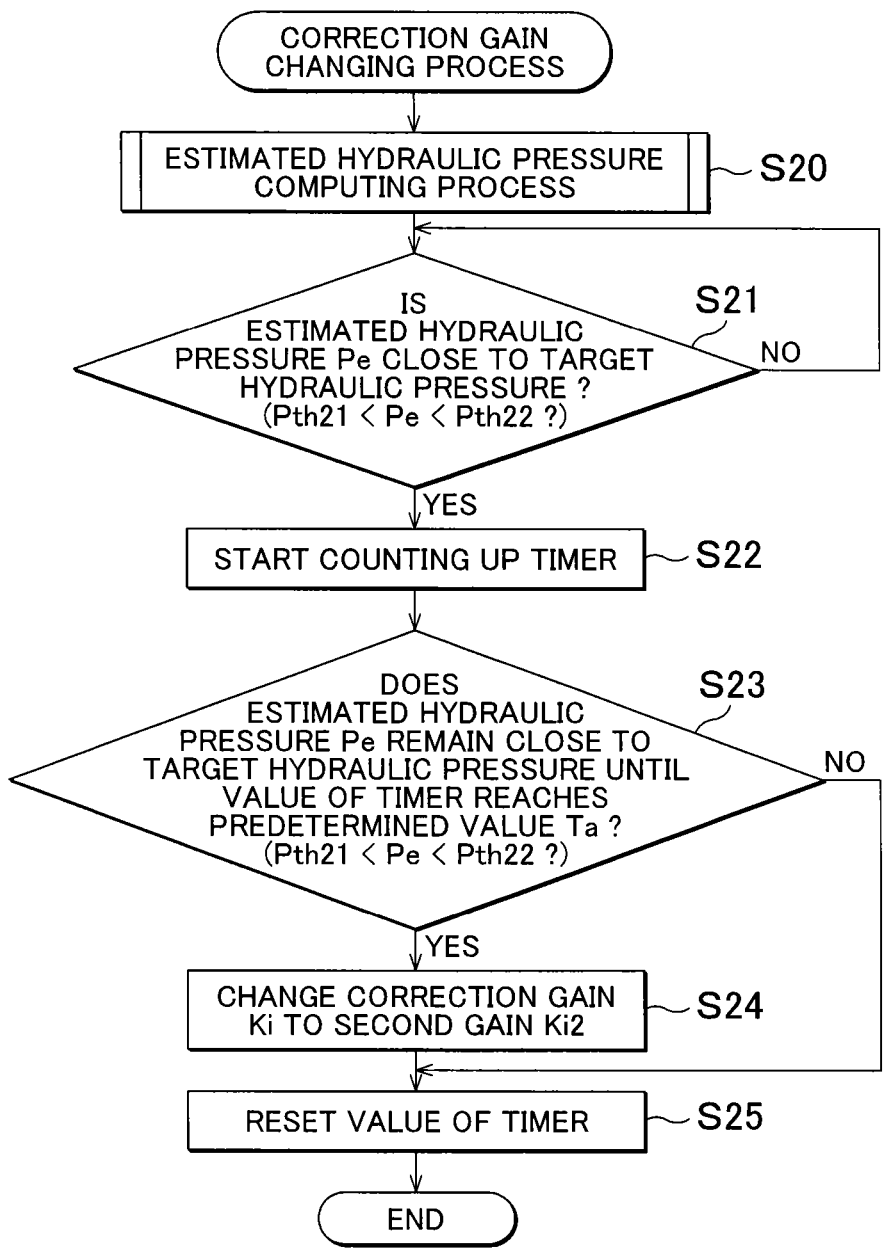
FIG. 9 is a flowchart that shows the procedure of a correction gain changing process that is executed by the electric pump system according to the second embodiment.

Next, the procedure in which the EOPECU 13 changes the correction gain Ki from the first gain Ki1 to the second gain Ki2 will be described with reference to FIG. 9. The process shown in FIG. 9 is started when a drive request signal is transmitted from the host ECU 6. After that, the control is repeatedly executed at predetermined computation intervals during a period until the stop request signal is transmitted to the EOPECU 13 from the host ECU 6.

As shown in FIG. 9, in this process, first, the estimated hydraulic pressure Pe is computed through the estimated hydraulic pressure computing process illustrated in FIG. 4 or FIG. 7 (step S20). In the subsequent process in step S21, the estimated hydraulic pressure Pe is monitored to determine whether the estimated hydraulic pressure Pe is a value around the target hydraulic pressure. Specifically, in the present embodiment, a third threshold Pth21 and a fourth threshold Pth22 are set for the estimated hydraulic pressure Pe. The third threshold Pth21 is a value that is slightly larger than the first threshold Pth11. The fourth threshold Pth22 is a value that is slightly smaller than the second threshold Pth12. When the estimated hydraulic pressure Pe satisfies the relationship, Pth21<Pe<Pth22, it is determined that the estimated hydraulic pressure Pe is a value around the target hydraulic pressure. When the estimated hydraulic pressure Pe is a value around the target hydraulic pressure (YES in step S21), the timer 18 incorporated in the EOPECU 13 starts counting up (step S22). In the subsequent process in step S23, it is determined whether the estimated hydraulic pressure Pe keeps exhibiting a value around the target hydraulic pressure until the value of the timer 18 reaches a predetermined value Ta. Specifically, the estimated hydraulic pressure Pe is computed at predetermined intervals through the estimated hydraulic pressure computing process illustrated in FIG. 4 or FIG. 7, and it is determined whether the estimated hydraulic pressure Pe that is computed each time satisfies the relationship, Pth21<Pe<Pth22. When the estimated hydraulic pressure Pe keeps exhibiting a value around the target hydraulic pressure until the value of the timer 18 reaches the predetermined value Ta (YES in step S23), it is determined that the estimated hydraulic pressure Pe is around the target hydraulic pressure and in a stable state, and the correction gain Ki is changed to the second gain Ki2 (step S24). Thus, the response of the power output from the motor 12 decreases. In the subsequent process in step S25, the value of the timer 18 is reset.

On the other hand, when the estimated hydraulic pressure Pe becomes a value that is not around the target hydraulic pressure before the value of the timer 18 reaches the predetermined value Ta (NO in step S23), the value of the timer 18 is reset without changing the correction gain Ki to the second gain Ki2 (step S25).

Next, an example of an operation (operation) of the electric pump system 10 according to the present embodiment will be described with reference to FIG. 10. When the hydraulic pressure of the hydraulic fluid is higher than the target hydraulic pressure, if the current command value Ia for the motor 12 is gradually reduced by an amount corresponding to the constant correction value Ala in order to decrease the power output from the motor 12. In this case, as indicated by the long dashed double short dashed line in FIG. 10B, when the hydraulic pressure of the hydraulic fluid is attempted to converge to the target hydraulic pressure, the hydraulic pressure of the hydraulic fluid keeps fluctuating. That is, the value of hydraulic pressure of the hydraulic fluid may diverge. In contrast to this, when the correction value ΔIa is reduced, it is possible to suppress the divergence. However, in this case, a period of time that is required to cause the hydraulic pressure of the hydraulic fluid to converge to the target hydraulic pressure may be prolonged.

Figures 10A, 10B:
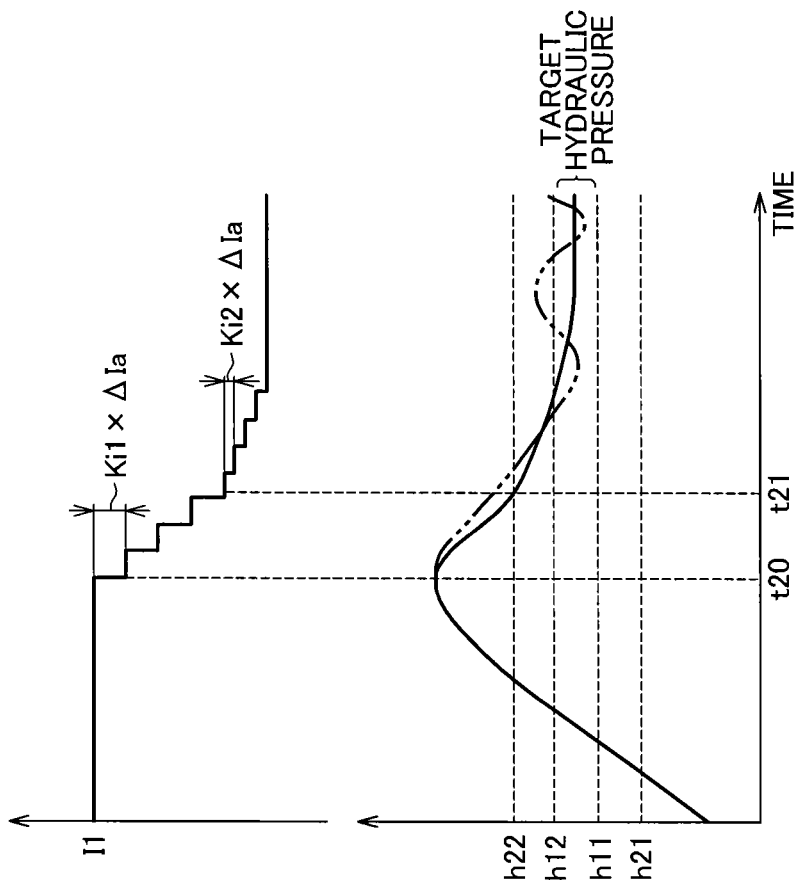
FIG. 10A and FIG. 10B are timing charts that show an example of an operation of the electric pump system according to the second embodiment.

In this regard, in the electric pump system 10 according to the present embodiment, for example, when the hydraulic pressure of the hydraulic fluid is higher than or equal to the fourth threshold Pth22 at time t20 as shown in FIG. 10B, the correction value ΔIa for the current command value Ia is multiplied by the first gain Ki1 at time t20. Therefore, as shown in FIG. 10A, an amount of change in the current command value Ia is large. That is, the power output from the motor 12 significantly decreases. Therefore, as shown in FIG.

10B, it is possible to bring the hydraulic pressure of the hydraulic fluid to a value around the target hydraulic pressure in a short period of time. When the hydraulic pressure of the hydraulic fluid becomes lower than the fourth threshold Pth22 at time t21, that is, when the hydraulic pressure of the hydraulic fluid becomes a value close to the target hydraulic pressure, the correction value ΔIa for the current command value Ia is multiplied by the second gain Kit as shown in FIG. 10A. Therefore, the amount of change in the current command value Ia is small. That is, after time t21, the amount of change in the power output from the motor 12 is small. Therefore, the hydraulic pressure of the hydraulic fluid easily converges to the target hydraulic pressure.

As described above, with the electric pump system according to the present embodiment, in addition to the advantageous effects 1) to 4) of the above-described first embodiment, the following advantageous effects are further obtained.

5) The correction gain Ki is set for the correction value ΔIa that is used to correct the current command value Ia for the motor 12 to increase or reduce the current command value Ia. When the estimated hydraulic pressure Pe becomes a value around the target hydraulic pressure and is in a stable state, the response of the power output from the motor 12 is delayed by reducing the correction gain Ki. Thus, it is possible to suppress divergence of the value of hydraulic pressure of the hydraulic fluid. Therefore, the above-described configuration is effective in causing the hydraulic pressure of the hydraulic fluid to converge to the target hydraulic pressure.

Next, an electric pump system according to a third embodiment of the invention will be described. The electric pump system according to the third embodiment is used in a system that supplies hydraulic fluid to a transmission mechanism of a vehicle. The basic configuration of the electric pump system according to the third embodiment is similar to that of the electric pump system according to the second embodiment.

In the present embodiment, when the fact that the fluid temperature of the hydraulic fluid crosses one of the boundaries between the three fluid temperature ranges described in a1) to a3) is detected, that is, when fluid temperature range boundary crossing is detected, the correction gain Ki set for the correction value ΔIa of the current command value Ia is returned from the second gain Ki2 to the first gain Ki1. Hereinafter, the details of the control for returning the correction gain Ki to the first gain Ki1 will be described with reference to FIG. 11 and FIG. 12. First, the procedure in which the EOPECU 13 returns the gain Ki of the correction value ΔIa from the second gain Ki2 to the first gain Ki1 will be described with reference to FIG. 11. The process shown in FIG. 11 is repeatedly executed at predetermined computation intervals when the correction gain Ki is set at the second gain Ki2.

Figure 11:
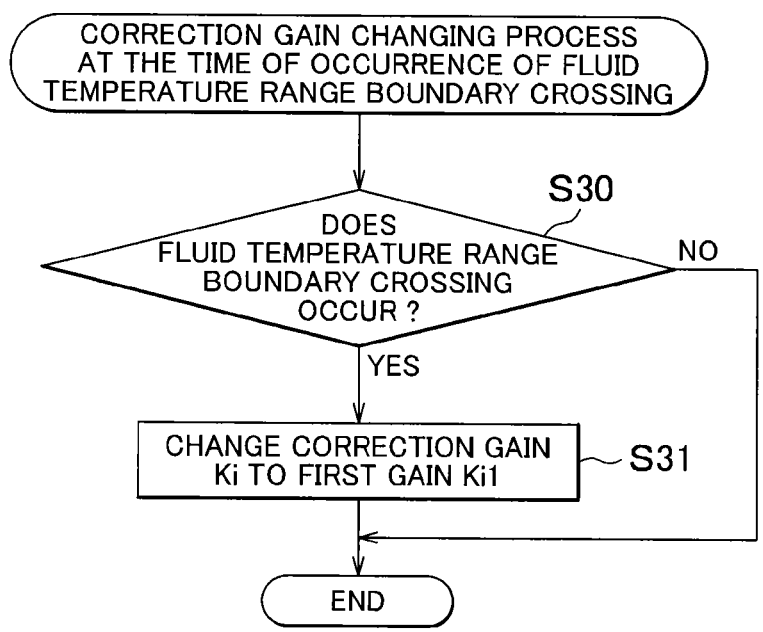
FIG. 11 is a flowchart that shows the procedure of a correction gain changing process that is executed by an electric pump system according to a third embodiment of the invention at the time of occurrence of fluid temperature range boundary crossing.
Figure 12:
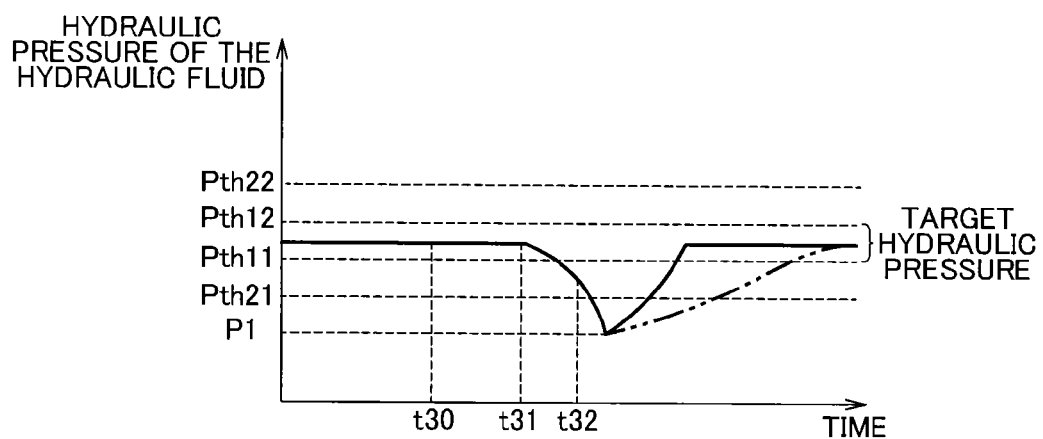
FIG. 12 is a timing chart that shows an example of an operation of the electric pump system according to the third embodiment.

As shown in FIG. 11, in this process, first, it is determined whether fluid temperature range boundary crossing occurs on the basis of the fluid temperature Toil of the hydraulic fluid (step S30). Specifically, when the fluid temperature range to which the immediately preceding detected fluid temperature belongs differs from the fluid temperature range to which the presently detected fluid temperature belongs on the basis of the fluid temperature information from the host ECU 6, it is determined that fluid temperature range boundary crossing occurs. For example, when the immediately preceding detected fluid temperature Toil is a temperature that falls within the low fluid temperature range and the presently detected fluid temperature Toil is a temperature that falls within the intermediate fluid temperature range, it is determined that fluid temperature range boundary crossing occurs.

When fluid temperature range boundary crossing occurs (YES in step S30), the correction gain Ki is changed to the first gain Ki1 (step S31).

On the other hand, when no fluid temperature range boundary crossing occurs (NO in step S30), the series of processes is ended. Next, an example of an operation (operation) of the electric pump system 10 according to the present embodiment will be described with reference to FIG. 12.

For example, when the hydraulic pressure of the hydraulic fluid is stably at the target hydraulic pressure and the fluid temperature of the hydraulic fluid is a temperature that falls within the low fluid temperature range, if the fluid temperature of the hydraulic fluid increases from time t31 and the temperature shifts from the low fluid temperature range to the intermediate fluid temperature range, the viscosity of the hydraulic fluid decreases. Therefore, the hydraulic pressure of the hydraulic fluid may decrease to a hydraulic pressure P1 that is lower than the target hydraulic pressure. At this time, if the correction gain Ki remains at the second gain Ki2, the response of the power output from the motor 12 is slow. Therefore, as indicated by a long dashed two short dashed line in FIG. 12, a long period of time may be required to cause the hydraulic pressure of the hydraulic fluid to converge to the target hydraulic pressure.

In this regard, in the present embodiment, when the fluid temperature of the hydraulic fluid changes so as to cross the boundary between the low fluid temperature range and the intermediate fluid temperature range at time t32, that is, when fluid temperature range boundary crossing occurs, the correction gain Ki is changed from the second gain Ki2 to the first gain Ki1 at time t32. Therefore, the response of the power output from the motor 12 increases. Thus, as indicated by the solid line in FIG. 12, it is possible to reduce a period of time that is required to cause the hydraulic pressure of the hydraulic fluid to converge to the target hydraulic pressure. Therefore, it is possible to further reliably suppress noise, or the like, that is generated from the electric pump system 10 as the motor 12 is driven.

As described above, with the electric pump system according to the present embodiment, in addition to the advantageous effects 1) to 5) of the above-described first and second embodiments, the following advantageous effects are further obtained.

6) When there is detected the fact that the fluid temperature of the hydraulic fluid crosses one of the boundary between the low fluid temperature range and the intermediate fluid temperature range and the boundary between the intermediate fluid temperature range and the high fluid temperature range, the correction gain Ki that is set for the correction value ΔIa for the current command value Ia is changed from the second gain Ki2 to the first gain Ki1. Thus, even when the hydraulic pressure of the hydraulic fluid that has once become stable deviates from the target hydraulic pressure with a change in the temperature of the hydraulic fluid, it is possible to reduce a period of time that is required to cause the hydraulic pressure of the hydraulic fluid to converge to the target hydraulic pressure again. Therefore, it is possible to further reliably suppress noise, or the like, that is generated from the electric pump system 10 as the motor 12 is driven.

The above-described embodiments may be modified into the following alternative embodiments as needed.

In the above-described third embodiment, when the fluid temperature of the hydraulic fluid changes to cross one of the boundaries between the three fluid temperature ranges, the correction gain Ki is changed from the second gain Ki2 to the first gain Ki1. Alternatively, the changed gain may be a value larger than the second gain Ki2 instead of the first gain Ki1.

In the above-described embodiments, the current command value Ia for the motor 12 is corrected by adding the correction value ΔIa to the current command value Ia or subtracting the correction value ΔIa from the current command value Ia. Alternatively, for example, a multiplication coefficient (gain) may be set for the current command value Ia and the current command value Ia may be corrected by increasing or reducing the gain. That is, the method of correcting the current command value Ia is not particularly limited as long as the current command value Ia for the motor 12 is increased or reduced such that the estimated hydraulic pressure Pe approaches the target hydraulic pressure.

In the above-described embodiments, the fluid temperature correction gain Kt is set for the estimated hydraulic pressure Pe, and the fluid temperature correction gain Kt is set to one of the values set for the respective three fluid temperature ranges. In this way, the estimated hydraulic pressure Pe is corrected on the basis of the fluid temperature of the hydraulic fluid. Alternatively, for example, a map that shows the correlation among the driving current Iw for the motor 12, the rotation speed N of the motor 12 and the estimated hydraulic pressure Pe as illustrated in FIG. 5 is prepared in advance for each of the three fluid temperature ranges. Then, the map that is used to compute the estimated hydraulic pressure Pe may be selected on the basis of the fluid temperature of the hydraulic fluid at that time. With such a method as well, it is possible to easily correct the estimated hydraulic pressure Pe for each of the three fluid temperature ranges.

In the above-described embodiments, the three fluid temperature ranges are set for the fluid temperature of the hydraulic fluid. However, the number of set fluid temperature ranges may be changed as needed.

In the above-described embodiments, the estimated hydraulic pressure Pe is corrected for each of the three fluid temperature ranges. However, such correction process may be omitted. That is, in the process illustrated in FIG. 4, it is possible to omit the processes of steps S12 and S13.

In the above-described embodiments, the EOPECU 13 detects the fluid temperature of the hydraulic fluid on the basis of the fluid temperature information provided from the host ECU 6. Alternatively, the EOPECU 13 may directly detect the fluid temperature of the hydraulic fluid by directly receiving the output from the temperature sensor 8.

In the above-described embodiments, the invention is applied to the electric pump system that is used in the oil supply system that includes the mechanical pump 2. However, the system to which the invention is applied is not limited to this. The invention may be applied to an electric pump system that is used in an oil supply system that includes a pump other than a mechanical pump. In addition, the electric pump system to which the invention is applied is not limited to the electric pump system that is used in the oil supply system that supplies hydraulic fluid to the transmission mechanism of the vehicle. The invention may be applied to an electric pump system that is used in an oil supply system that supplies hydraulic fluid to an appropriate hydraulically-actuated device.

With the electric pump system according to the invention, it is possible to reduce consumption of electricity while further reliably ensuring the hydraulic pressure that is required to actuate a hydraulically-actuated device.

What is claimed is:

1. A system for supplying hydraulic fluid to a hydraulically-actuated device through an oil passage, comprising:
   an electric motor driven by electrical power supplied from a battery, wherein the battery voltage decreases over time from a voltage set in advance;
   motor control means for controlling at least a driving current of the electrical power for driving the electric motor;
   an oil pump driven by the electric motor and that supplies the hydraulic fluid to the hydraulically-actuated device through the oil passage as the electric motor is driven; and
   hydraulic pressure estimating means for estimating the hydraulic pressure value of the hydraulic fluid in the oil passage, based on the driving current for the motor and a rotation speed of the electric motor,
   wherein the motor control means executes drive control on the electric motor based on the estimated hydraulic pressure value of the hydraulic fluid in the oil passage,
   and wherein the motor control means corrects the estimated hydraulic pressure value based on the decrease of the voltage of the electrical power from the battery as compared to the voltage set in advance, for driving the electric motor.

2. The electric pump system according to claim 1, wherein the motor control means corrects the estimated hydraulic pressure value based on a fluid temperature of the hydraulic fluid.

3. The electric pump system according to claim 2, wherein the estimated hydraulic pressure value is corrected for each of a plurality of fluid temperature ranges defined in advance.

4. The electric pump system according to claim 3, wherein the estimated hydraulic pressure value is corrected by multiplying the estimated hydraulic pressure value by one of a plurality of fluid temperature correction gains that are set for the respective fluid temperature ranges.

5. The electric pump system according to claim 1, wherein the hydraulic pressure of the hydraulic fluid is estimated through computation using a map that defines, in advance, a correlation among the driving current for the motor, the rotation speed of the motor and the hydraulic pressure of the hydraulic fluid, and the estimated hydraulic pressure value is corrected by making switchover among the maps that are set for the respective fluid temperature ranges.

6. The electric pump system according to claim 3, wherein the hydraulic pressure of the hydraulic fluid is estimated through computation using a map that defines, in advance, a correlation among the driving current for the motor, the rotation speed of the motor and the hydraulic pressure of the hydraulic fluid, and the estimated hydraulic pressure value is corrected by making switchover among the maps that are set for the respective fluid temperature ranges.

7. The electric pump system according to claim 1, wherein, when it is determined that the estimated hydraulic pressure value is not a target hydraulic pressure value, the motor control means corrects a current command value for the motor to increase or reduce the current command value by a first correction value such that the estimated hydraulic pressure value approaches the target hydraulic pressure value.

8. The electric pump system according to claim 2, wherein, when it is determined that the estimated hydraulic pressure value is not a target hydraulic pressure value, the motor control means corrects a current command value for the motor to increase or reduce the current command value by a first correction value such that the estimated hydraulic pressure value approaches the target hydraulic pressure value.

9. The electric pump system according to claim 3, wherein, when it is determined that the estimated hydraulic pressure value is not a target hydraulic pressure value, the motor control means corrects a current command value for the motor to increase or reduce the current command value by a first correction value such that the estimated hydraulic pressure value approaches the target hydraulic pressure value.

10. The electric pump system according to claim 4, wherein, when it is determined that the estimated hydraulic pressure value is not a target hydraulic pressure value, the motor control means corrects a current command value for the motor to increase or reduce the current command value by a first correction value such that the estimated hydraulic pressure value approaches the target hydraulic pressure value.

11. The electric pump system according to claim 5, wherein, when it is determined that the estimated hydraulic pressure value is not a target hydraulic pressure value, the motor control means corrects a current command value for the motor to increase or reduce the current command value by a first correction value such that the estimated hydraulic pressure value approaches the target hydraulic pressure value.

12. The electric pump system according to claim 6, wherein, when it is determined that the estimated hydraulic pressure value is not a target hydraulic pressure value, the motor control means corrects a current command value for the motor to increase or reduce the current command value by a first correction value such that the estimated hydraulic pressure value approaches the target hydraulic pressure value.

13. The electric pump system according to claim 7, wherein, when it is determined that the estimated hydraulic pressure value is around the target hydraulic pressure value, the motor control means changes a correction value, which is used to correct the current command value for the motor to increase or reduce the current command value, to a second correction value that is smaller than the first correction value.

14. The electric pump system according to claim 8, wherein, when it is determined that the estimated hydraulic pressure value is around the target hydraulic pressure value, the motor control means changes a correction value, which is used to correct the current command value for the motor to increase or reduce the current command value, to a second correction value that is smaller than the first correction value.

15. The electric pump system according to claim 13, wherein, when a fact that a fluid temperature of the hydraulic fluid is changed is detected, the motor control means changes the correction value, which is used to correct the current command value for the motor to increase or reduce the current command value, from the second correction value to the first correction value.

16. The electric pump system according to claim 14, wherein, when a fact that a fluid temperature of the hydraulic fluid is changed is detected, the motor control means changes the correction value, which is used to correct the current command value for the motor to increase or reduce the current command value, from the second correction value to the first correction value.

* * * * *